(12) United States Patent
Lei

(10) Patent No.: US 12,507,224 B2
(45) Date of Patent: Dec. 23, 2025

(54) METHOD AND APPARATUS FOR SCHEDULING PHYSICAL UPLINK SHARED CHANNEL (PUSCH) AND PHYSICAL DOWNLINK SHARED CHANNEL (PDSCH)

(71) Applicant: Lenovo (Beijing) Ltd., Beijing (CN)

(72) Inventor: Haipeng Lei, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 500 days.

(21) Appl. No.: 17/792,767

(22) PCT Filed: Feb. 14, 2020

(86) PCT No.: PCT/CN2020/075324
§ 371 (c)(1),
(2) Date: Jul. 14, 2022

(87) PCT Pub. No.: WO2021/159484
PCT Pub. Date: Aug. 19, 2021

(65) Prior Publication Data
US 2023/0052620 A1 Feb. 16, 2023

(51) Int. Cl.
*H04W 72/04* (2023.01)
*H04W 72/0453* (2023.01)
*H04W 72/12* (2023.01)
*H04W 72/1268* (2023.01)
*H04W 72/23* (2023.01)

(52) U.S. Cl.
CPC ... *H04W 72/0453* (2013.01); *H04W 72/1268* (2013.01); *H04W 72/23* (2023.01)

(58) Field of Classification Search
CPC ......... H04W 72/0446; H04W 72/0453; H04W 72/1263; H04W 72/1268; H04W 72/1273; H04W 72/21; H04W 72/23
See application file for complete search history.

(56) References Cited

U.S. PATENT DOCUMENTS

| 9,236,992 B2 * | 1/2016 | Chung | H04L 5/0053 |
| 10,327,258 B2 * | 6/2019 | Yang | H04L 5/0055 |
| 10,652,865 B2 * | 5/2020 | Hwang | H04W 72/23 |
| 10,779,311 B2 * | 9/2020 | Tooher | H04L 5/0051 |

(Continued)

FOREIGN PATENT DOCUMENTS

| CN | 107005512 A | 8/2017 |
| CN | 107431604 A | 12/2017 |

(Continued)

OTHER PUBLICATIONS 20918833.3 , "Extended European Search Report", EP Application No. 20918833.3, Oct. 9, 2023, 14 pages.

(Continued)

*Primary Examiner* — Alpus Hsu
(74) *Attorney, Agent, or Firm* — FIG. 1 Patents

(57) ABSTRACT

A method for scheduling Physical Uplink Shared Channel (PUSCH) is performed by a user equipment (UE). The method includes receiving a signal scheduling a first number of PUSCHs on a second number of frequency resources, wherein the first number of PUSCHs are scheduled with same time domain resource; and transmitting one or more PUSCHs of the first number of PUSCHs on the second number of frequency resources.

20 Claims, 11 Drawing Sheets

501 — receiving a signal scheduling a first number of PUSCHs on a second number of frequency resources, wherein the first number of PUSCHs are scheduled with same time domain resource 502 — transmitting one or more PUSCHs of the first number of PUSCHs on the second number of frequency resources

(56) References Cited

U.S. PATENT DOCUMENTS

| | | |
|---|---|---|
| 2013/0077593 A1* | 3/2013 | Han .................. H04L 5/0057 |
| | | 370/329 |
| 2016/0007357 A1 | 1/2016 | Yano et al. |
| 2018/0092064 A1 | 3/2018 | Ryu et al. |
| 2018/0279274 A1* | 9/2018 | Sun ..................... H04W 52/38 |
| 2018/0368188 A1* | 12/2018 | Aiba ............... H04W 74/0833 |
| 2019/0150187 A1* | 5/2019 | Park ..................... H04L 5/0094 |
| | | 370/330 |
| 2019/0158252 A1* | 5/2019 | Li ......................... H04W 76/27 |
| 2019/0182807 A1* | 6/2019 | Panteleev ............ H04L 5/0048 |
| 2019/0215104 A1 | 7/2019 | Salem et al. |
| 2019/0268971 A1* | 8/2019 | Talarico ................ H04W 76/27 |
| 2019/0289635 A1* | 9/2019 | Wang ................... H04L 27/0006 |
| 2019/0335493 A1* | 10/2019 | Xiong ................... H04L 5/0057 |
| 2019/0394759 A1* | 12/2019 | Ying ..................... H04L 1/0061 |
| 2020/0022144 A1* | 1/2020 | Papasakellariou .... H04W 72/23 |
| 2020/0162208 A1* | 5/2020 | Moon ................... H04W 72/23 |
| 2020/0187237 A1* | 6/2020 | Su ......................... H04L 1/1896 |
| 2020/0267730 A1* | 8/2020 | Kim .................. H04W 72/0453 |
| 2021/0105090 A1* | 4/2021 | Park ..................... H04W 80/02 |
| 2021/0176776 A1* | 6/2021 | Choi ........................ H04L 1/08 |
| 2021/0235496 A1* | 7/2021 | Park ...................... H04B 1/715 |
| 2021/0314982 A1* | 10/2021 | Panteleev ............. H04L 5/0044 |
| 2021/0345366 A1* | 11/2021 | Ying .................. H04W 72/1263 |
| 2021/0352655 A1* | 11/2021 | Xiong .................. H04W 72/23 |

FOREIGN PATENT DOCUMENTS

| | | |
|---|---|---|
| EP | 2579667 A1 | 4/2013 |
| WO | 2018038777 A1 | 3/2018 |
| WO | 2019214676 A1 | 11/2019 |
| WO | 2020029698 A1 | 2/2020 |
| WO | 2020030555 A1 | 2/2020 |

OTHER PUBLICATIONS

Huawei , "Feature lead summary#2 of HARQ enhancements for NR-U", 3GPP TSG RAN WG1 Meeting #99, R1-1913418, Reno, USA [retrieved Aug. 24, 2022]. Retrieved from the internet <https://www.3gpp.org/DynaReport/TDocExMtg-R1-99-32827.htm>., Nov. 2019, 43 Pages.

LG Electronics , "Discussion on resource allocation and TBS determination", 3GPP TSG RAN WG1 Meeting 91, R1-1719929, Reno, USA [retrieved Aug. 24, 2022]. Retrieved from the internet <https://www.3gpp.org/ftp/tsg_ran/WG1_RL1/TSGR1_91/Docs>., Dec. 2017, 16 Pages.

PCT/CN2020/075324 , "International Search Report and Written Opinion", PCT Application No. PCT/CN2020/075324, Nov. 18, 2020, 6 pages.

PCT/CN2020/075324 , "International Preliminary Report on Patentability", US Application No. PCT/CN2020/075324, Aug. 25, 2022, 5 pages.

"Foreign Office Action", CN Application No. 202080096361.4, Nov. 30, 2024, 24 pages.

Huawei, et al., "Scheduling and resource allocation mechanism for active bandwidth parts", 3GPP TSG RAN WG1 NR Ad Hoc Meeting, R1-1709974, Qingdao, China, Jun. 2017, 7 pages.

\* cited by examiner

METHOD AND APPARATUS FOR SCHEDULING PHYSICAL UPLINK SHARED CHANNEL (PUSCH) AND PHYSICAL DOWNLINK SHARED CHANNEL (PDSCH)

TECHNICAL FIELD

The subject disclosure relates to $3^{rd}$ Generation Partnership Project (3GPP) 5G New Radio (NR), and especially to a method and apparatus for scheduling Physical Uplink Shared Channel (PUSCH) or Physical Downlink Shared Channel (PDSCH).

BACKGROUND OF THE INVENTION

For New Radio access over unlicensed spectrum (NR-U), the unlicensed spectrum at 5.7 GHz has a wide bandwidth up to hundreds of MHz. For Ultra-Reliable Low Latency (URLLC) service on unlicensed spectrum, the following problems might happen: 1) when URLLC is to be transmitted on the carrier but the Listen Before Talk (LBT) on the carrier failed, the URLLC cannot be transmitted, thus the latency requirements might not be met; and 2) due to the hidden node interference, when URLLC is transmitted on the carrier and LBT is successful, the reliability of the URLLC may not meet the reliability requirements.

In addition, when multiple Downlink Control Information (DCI) formats are used to schedule multiple PUSCHs or PDSCHs on multiple subbands or on multiple carriers, wherein LBT is performed separately on each subband/carrier, the control signaling overhead is high, which may lead to PDCCH capacity blocking.

SUMMARY

It is desirable to provide a solution to solve aforementioned problems and further improve spectrum utilization efficiency.

One embodiment of the subject disclosure provides a method for scheduling Physical Uplink Shared Channel (PUSCH), comprising: receiving a signal scheduling a first number of PUSCHs on a second number of frequency resources, wherein the first number of PUSCHs are scheduled with same time domain resource; and transmitting one or more PUSCHs of the first number of PUSCHs on the second number of frequency resources.

Another embodiment of the subject application provides a method for scheduling Physical Downlink Shared Channel (PDSCH), comprising: receiving a signal scheduling a first number of PDSCHs on a second number of frequency resources, wherein the first number of PDSCHs are scheduled with same time domain resource; and receiving one or more PDSCHs of the first number of PDSCHs on the second number of frequency resources.

Yet another embodiment of the subject disclosure provides a method for scheduling Physical Uplink Shared Channel (PUSCH), comprising: transmitting a signal scheduling a first number of PUSCHs on a second number of frequency resources, wherein the first number of PUSCHs are scheduled with same time domain resource; and receiving one or more PUSCHs of the first number of PUSCHs on the second number of frequency resources.

Still another embodiment of the subject disclosure provides a method for scheduling Physical Downlink Shared Channel (PDSCH), comprising: transmitting a signal scheduling a first number of PDSCHs on a second number of frequency resources, wherein the first number of PDSCHs are scheduled with same time domain resource; and transmitting one or more PDSCHs of the first number of PDSCHs on the second number of frequency resources.

Still another embodiment of the subject disclosure provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method for scheduling Physical Uplink Shared Channel (PUSCH), comprising: receiving a signal scheduling a first number of PUSCHs on a second number of frequency resources, wherein the first number of PUSCHs are scheduled with same time domain resource; and transmitting one or more PUSCHs of the first number of PUSCHs on the second number of frequency resources.

Still another embodiment of the subject disclosure provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method for scheduling Physical Uplink Shared Channel (PUSCH), comprising: transmitting a signal scheduling a first number of PUSCHs on a second number of frequency resources, wherein the first number of PUSCHs are scheduled with same time domain resource; and receiving one or more PUSCHs of the first number of PUSCHs on the second number of frequency resources.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

The embodiments provide a method and apparatus for downlink (DL) or uplink (UL) data transmission on an unlicensed spectrum. To facilitate understanding, the embodiments are provided under specific network architecture and new service scenarios, such as 3GPP 5G, 3GPP LTE Release 8 and so on. Persons skilled in the art know very well that, with the future development of network architecture and new service scenarios, the embodiments in the present disclosure are also applicable to similar technical problems.

Figure 1:
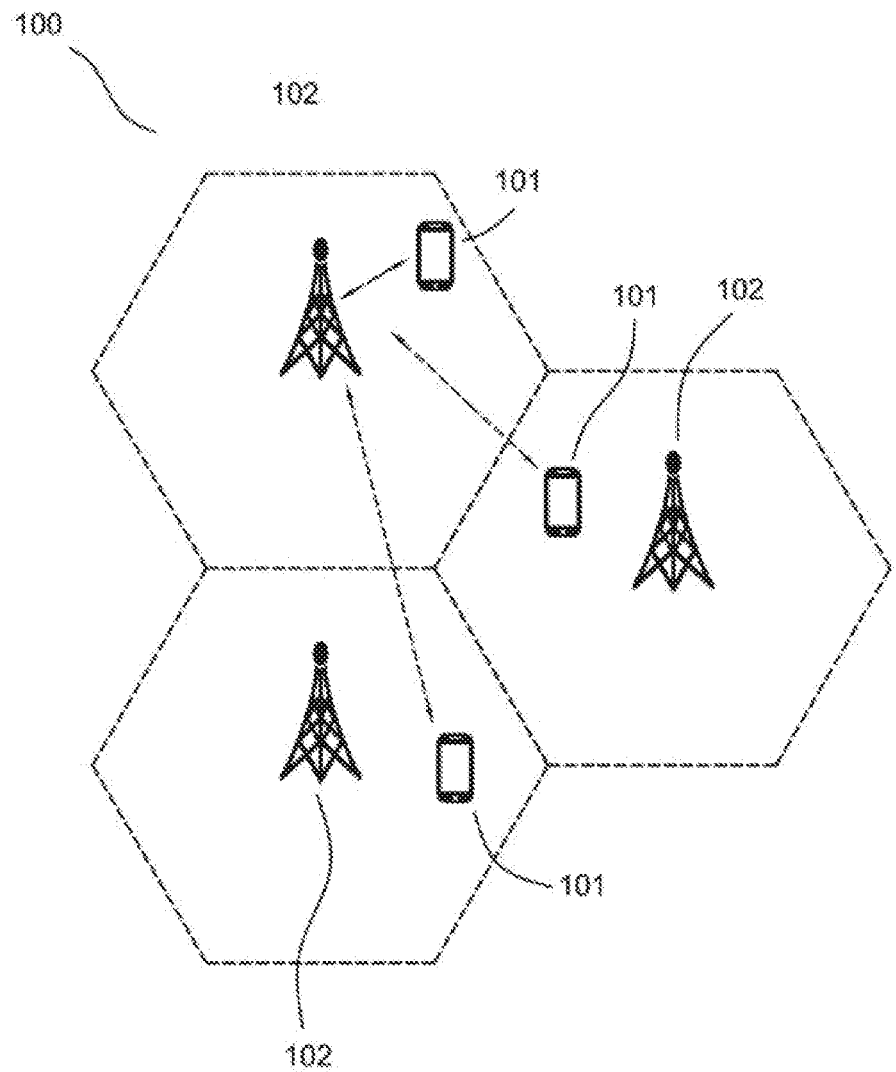
FIG. 1 illustrates a schematic diagram of a wireless communication system in accordance with some embodiments of the subject disclosure.

FIG. 1 illustrates a wireless communication system 100 according to an embodiment of the present disclosure.

As shown in FIG. 1, the wireless communication system 100 includes UE 101 and BS 102. In particular, the wireless communication system 100 includes three UEs 101 and three BSs 102 for illustrative purpose only. Even though a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 101 include wearable devices, such as smart watches, fitness bands, optical head-mounted displays, or the like. Moreover, the UEs 101 may be referred to as a subscriber unit, a mobile phone, a mobile station, a user, a terminal, a mobile terminal, a wireless terminal, a fixed terminal, a subscriber station, a user terminal, or any device described using other terminology used in the art. The UEs 101 may communicate directly with the BSs 102 via uplink (UL) communication signals.

The BSs 102 may be distributed over a geographic region. In certain embodiments, each of the BSs 102 may also be referred to as an access point, an access terminal, a base, a macro cell, a Node-B, an enhanced Node B (eNB), a gNB, a Home Node-B, a relay node, or any device described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In one embodiment, the wireless communication system 100 is compatible with the 5G new radio (NR) of the 3GPP protocol, wherein the BSs 102 transmit data using an orthogonal frequency division multiplexing (OFDM) modulation scheme on the downlink and the UEs 101 transmit data on the uplink using Discrete Fourier Transform-Spread-Orthogonal Frequency Division Multiplexing (DFT-S-OFDM) or Cyclic Prefix-Orthogonal Frequency Division Multiplexing (CP-OFDM) scheme. More generally, however, the wireless communication system 100 may implement some other open or proprietary communication protocols, for example, WiMAX, among other protocols.

In other embodiments, the BSs 102 may communicate using other communication protocols, such as the IEEE 802.11 family of wireless communication protocols. Further, in some embodiments, the BSs 102 may communicate over licensed spectrums, whereas in other embodiments the BSs 102 may communicate over unlicensed spectrums. The present disclosure is not intended to be limited to the implementation of any particular wireless communication system architecture or protocol. In another embodiment, the BSs 102 may communicate with the UEs 101 using 3GPP 5G protocols.

For transmission on unlicensed spectrum, in order to achieve fair coexistence with other wireless systems, Listen Before Talk (LBT) is required before the transmission on unlicensed spectrum. By means of performing energy detection on a certain channel, if the received power is below a predefined threshold, then the LBT is successful, which means the channel is deemed as empty and available for transmission. Only when the LBT is successful, an equipment can start the transmission on the channel and occupy the channel up to a maximum channel occupancy time (MCOT); otherwise, the equipment cannot start the transmission and continue to performing LBT until a successful LBT.

In addition, wireless signal transmission on unlicensed spectrum should meet the requirements of regulation subject to the management of the located country/region. Hence, the design of uplink waveform for NR-U PUSCH/PUCCH should meet the regulation requirements on unlicensed spectrum.

The requirements mainly include two aspects:
  i. Occupied channel bandwidth (OCB): the bandwidth containing 99% of the power of the signal, shall be between 80% and 100% of declared nominal channel bandwidth; and
  ii. Maximum Power Spectrum Density (PSD) with a resolution bandwidth of 1 MHz, e.g., 10 dBm/MHz.

These two requirements dictate that a signal which occupies a small portion of the channel bandwidth cannot be transmitted at the maximum available power at the UE due to the PSD and OCB constraints.

In 5G NR, very wide bandwidth is supported, for example, up to 100 MHz bandwidth for Frequency Range 1 (FR1, 450 MHz-6000 MHz) and up to 400 MHz bandwidth for Frequency Range 2 (FR2, 24250 MHz-52600 MHz). Since the unlicensed spectrum at 5.7 GHz has a wide bandwidth up to hundreds of MHz, NR-U also inherits the characteristic of wide bandwidth design.

In order to achieve fair coexistence between NR-U and Wi-Fi on unlicensed spectrum, NR-U operating bandwidth is an integer multiple of 20 MHz. A channel access procedure, also named Listen-Before-Talk (LBT) test, is performed in units of 20 MHz. For a bandwidth larger than 20 MHz, e.g., 40/60/80/100 MHz, these bandwidths are partitioned into subband, each subband has a bandwidth of 20 MHz.

Figure 2:
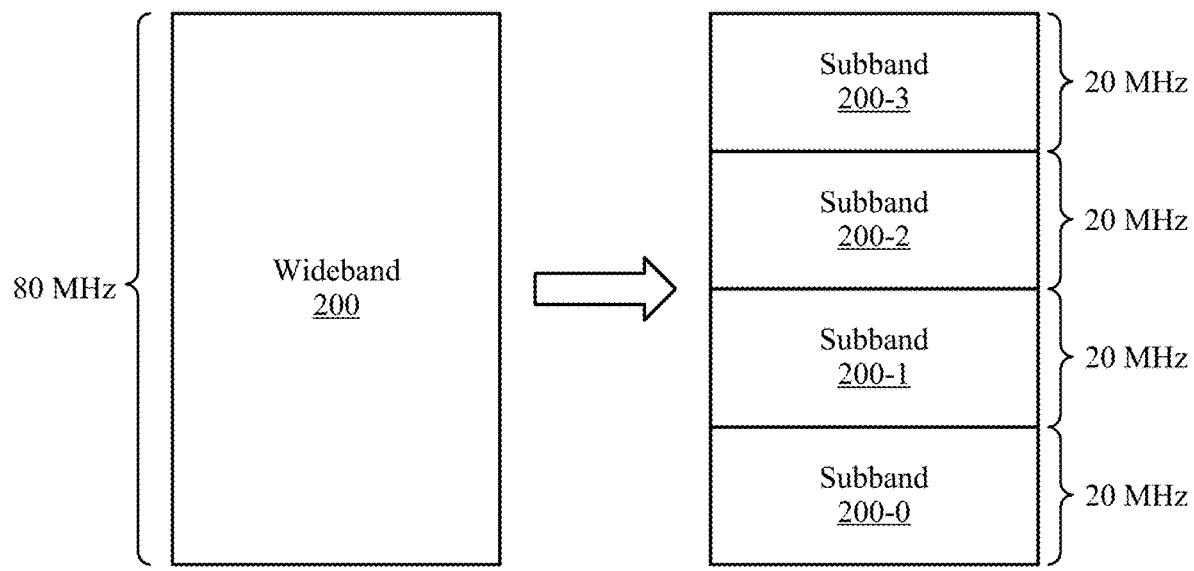
FIG. 2 illustrates a subband-based LBT for a wide carrier.

Based on the agreement, LBT for NR-U is preformed based on 20 MHz. Therefore, for a bandwidth with integer multiple of 20 MHz, there are two ways for channel access:

i. By Carrier Aggregation (CA). In CA mode, similar to LTE LAA/eLAA, the UE or the BS performs LBT for each component carrier (e.g., 20 MHz) based on multi-carrier LBT operation specified in LTE LAA/eLAA, then transmit on each available carrier.

ii. By subband operation. The UE or the BS performs LBT on each subband (e.g., 20 MHz) and aggregates available subbands for a single PUSCH/PDSCH. E.g., when LBT for some subbands are successful while for other subbands are not, then the UE or the BS can transmit data on the subbands with successful LBT. As shown in FIG. 2, if subbands 200-0 and 200-3 have successful LBT outcome, then only subbands 200-0 and 200-3 can be simultaneously used for PUSCH/PDSCH transmission.

The above two approaches have different advantages, the CA-based LBT has less standard impact (using LTE-based License Assisted Access (LAA) as baseline) and require less stringent processing requirements since each TB is processed independently on each CC. The subband based LBT has two advantages: (1) the spectral efficiency is improved compared to CA since there is no need to place the guardband(s) between contiguous subbands; (2) dynamic spectrum usage is realized with finer granularity of LBT bandwidth.

For DL transmission, the base station performs the LBT test per subband (e.g., 20 MHz per subband) and aggregates available subbands for a single Physical Downlink Shared Channel (PDSCH). That is, when the LBT tests for some subbands are successful while for other subbands are not, the base station can transmit data only on the subbands with successful LBT result. For example, as shown in FIG. 2, reference numeral 200 represents a wideband with a bandwidth of 80 MHz, and reference numerals 200-0, 200-1, 200-2, and 200-3 represent subbands with a bandwidth of 20 MHz. If subbands 200-2 and 200-3 have successful LBT results while subbands 200-0 and 200-1 do not, then PDSCH transmission of the base station can only be transmitted on subbands 200-2 and 200-3.

For UL transmission, UE performs LBT test per assigned subbands (e.g., 20 MHz per subband) and transmits Physical Uplink Shared Channel (PUSCH) on the available subbands. Namely, when LBT for some of assigned subbands are successful while for other subbands are not, then UE can transmit data on the subbands with successful LBT. For instance, as depict in FIG. 2, since the LBT results of subbands 200-2 and 200-3 are successful, subbands 200-2 and 200-3 can be used for PUSCH transmission.

From the perspective of scheduling, the scheduling decision is made before performing LBT. E.g., when a TB is determined to be transmitted on a wide frequency as shown in the left part of FIG. 2, subject to LBT, not all the subbands are available for the TB transmission. In this case, there are two natural options can be considered: 1) rate matching on the available subbands; or 2) puncture the data to be transmitted on the unavailable subbands.

With the rate matching method, high coding rate will be caused in order to transmit the scheduled TB only in the available subbands and the coding rate is variable dependent on the number of available subbands. Furthermore, UE may not have enough processing time to perform rate matching considering there is nearly no extra time from the time instant when the LBT outcome is considered successful to the time instant that UE starts UL transmission. Accordingly, rate matching is not a desirable solution for subband-based LBT operation.

With the puncturing method, the TB part that is mapped to the subband with failed LBT is punctured. The benefit of this method is that UE implementation is simple. However, too much data being punctured may lead to failed TB decoding at gNB side.

Furthermore, when URLLC service is supported on unlicensed spectrum, it does make sense to allocate very wide spectrum in frequency domain and quite short duration in time domain so as to meet the requirements on short latency and high date rate. However, due to the unpredicted LBT procedure, when URLLC is to be transmitted on the carrier while the LBT is failed, the URLLC cannot be transmitted, which may not meet the latency requirements; on the other hand, due to the hidden node interference, when URLLC is transmitted on the carrier and LBT is successful, the reliability of the URLLC may not meet the reliability requirements.

In addition, when multiple DCI formats are used to schedule multiple PUSCHs or PDSCHs on multiple subbands, wherein LBT is performed separately on each subband, control signaling overhead is high, which may lead to PDCCH capacity blocking.

In this disclosure, several solutions are proposed to solve the above technical problems. Specifically, several alternatives are proposed for multiple PUSCH scheduling on unlicensed spectrum so as to further improve data transmission reliability and save control signaling overhead.

One preferred embodiment of the subject disclosure relates to a signal, for example, a single DCI format, scheduling multiple PUSCHs/PDSCHs on multiple subbands or multiple carriers and the multiple PUSCHs/PDSCHs have the same time domain resource allocation. The maximum number of PUSCHs which could be scheduled by the single DCI format is configured by RRC signaling, the maximum number might be 1, 2, 4, 8, 12, 16, 32 etc.

In Rel-14 LTE eLAA, interlace-based waveform is adopted for unlicensed spectrum. For frequency domain resource allocation, both the interlace and the subband need to be indicated. For NR-U 20 MHz bandwidth in NR-U, Radio Access Network Working Group 1 (RAN1) has agreed to use 10 interlaces for 15 kHz subcarrier spacing, and to use 5 interlaces for 30 kHz subcarrier spacing.

Regarding 15 KHz subcarrier spacing, assuming the 10 interlaces are contiguous allocated, the Resource Indication Value (RIV) based indication indicates the index of the starting interlace and the total number of contiguous interlaces, thus 6 bits are required for contiguous interlace allocation by means of RIV. For 30 kHz subcarrier spacing, there are 5 interlaces, and bitmap-based indication is used to indicate the interlaces, therefore, 5 bits are required for bitmap-based indication.

Assuming that the assigned subbands are also contiguous, therefore, RIV based indication is used to indicate the assigned contiguous subbands. Suppose there are M subbands in total in the active Uplink Bandwidth Part (BWP), then $$\left\lceil \log_2 \left( \frac{M(M+1)}{2} \right) \right\rceil$$

bits are required for indicating the assigned contiguous subbands.

Therefore, for indicating the assigned interlaces and assigned subbands for active UL BWP using 15 kHz subcarrier spacing, $$6 + \left\lceil \log_2 \left( \frac{M(M+1)}{2} \right) \right\rceil$$

bits are needed, and for 30 kHz subcarrier, $$5 + \left\lceil \log_2 \left( \frac{M(M+1)}{2} \right) \right\rceil$$

bits are needed.

When multiple PUSCHs or multiple PDSCHs on multiple carriers scheduled by single DCI format, the scheduled carriers can be also indicated using the RIV method. Assuming there are Z carriers configured, then $$\left\lceil \log_2 \left( \frac{Z(Z+1)}{2} \right) \right\rceil$$

bits are needed to indicate the RIV value.

Based on the above frequency domain resource allocation, the subject disclosure proposes a method to map the scheduled PUSCHs/PDSCHs to the assigned subbands on one carrier or to the assigned carriers. The principle is to ensure nearly equal number of subbands per PUSCH, for example, any one PUSCH occupies at most more than one subband compared to any other PUSCH.

Figure 3A:
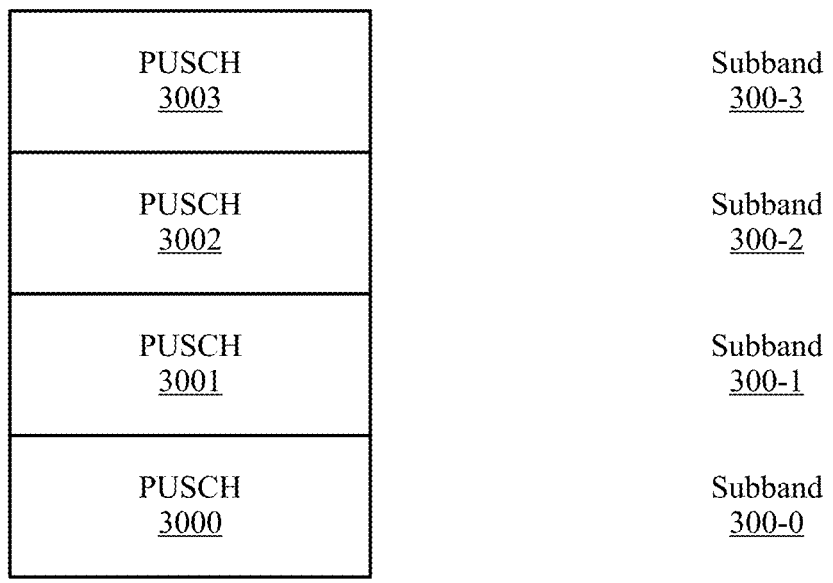
FIG. 3(a) illustrates an embodiment of a signal scheduling multiple PUSCHs/PDSCHs with one subband or one carrier per PUSCH/PDSCH according to a preferred embodiment of the subject disclosure.

FIG. 3(a) illustrates an embodiment of one DCI format scheduling multiple PUSCHs/PDSCHs with one subband or one carrier per PUSCH/PDSCH according to a preferred embodiment of the subject disclosure. For simplicity, the following content only describes PUSCHs occupying subbands, it should be noted that the embodiment could also apply to PDSCHs occupying subbands, PDSCHs occupying carriers, and PUSCHs occupying carriers. As explained above, in this subject disclosure, interlaced-based waveform is adopted, therefore, the term "occupy" here means the scheduled PUSCHs use the interlaces in the subband or in the carrier in frequency domain, not use all of the frequency resources in the subband or in the carrier in frequency domain.

In FIG. 3(a), there are four PUSCHs, which are represented using the reference numerals 3000, 3001, 3002, and 3003; and there are four subbands, which are represented using the reference numerals 300-0, 300-1, 300-2, and 300-3. In this embodiment, the number of scheduled PUSCH is always equal to the number of assigned subbands. Therefore, it is not necessary to indicate the number of actually scheduled PUSCHs in the UL grant since the number of actually scheduled PUSCHs is equal to the number of assigned subbands. Each scheduled PUSCH is restricted within the region of the associated subband and not across the subband boundary in frequency domain. For example, PUSCH 3000 is restricted within the region of subband 300-0. Rate matching is independently performed for each PUSCH in the associated subband, and LBT is performed independently in each of the assigned subbands. For example, rate matching for PUSCH 3000 is performed in subband 300-0, and LBT for subbands 300-0, 300-1, 300-2, and 300-3 are independently performed.

Figure 3B:
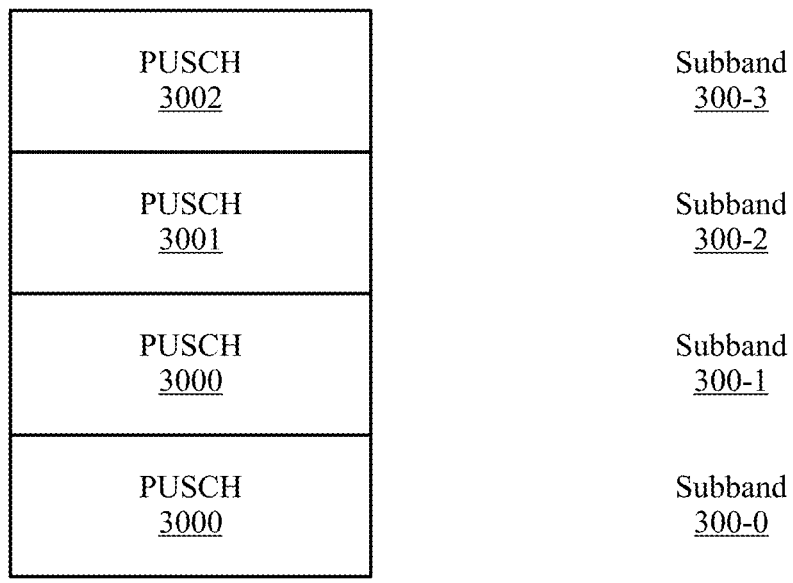
FIG. 3(b) illustrates another embodiment of a signal scheduling multiple PUSCHs/PDSCHs with one or more subbands or one or more carriers per PUSCH/PDSCH according to a preferred embodiment of the subject disclosure.

FIG. 3(b) illustrates an embodiment of one DCI format scheduling multiple PUSCHs/PDSCHs with one or more subbands or one or more carriers per PUSCH/PDSCH according to a preferred embodiment of the subject disclosure. For simplicity, the following content only describes PUSCHs occupying subbands, it should be noted that the embodiment could also apply to PDSCHs occupying subbands, PDSCHs occupying carriers, and PUSCHs occupying carriers.

Suppose there are M subbands and N PUSCHs, and M>N, then one or more scheduled PUSCHs can occupy more than one subband in frequency domain. In this embodiment, the number of actually scheduled PUSCHs, N, is indicated in the UL grant, and is represented using $\lceil \log_2 N_{max} \rceil$ bits, wherein $N_{max}$ is the maximum number of schedulable PUSCHs scheduled by a single UL grant, and $N_{max}$ is configured by RRC signaling.

As discussed above, the subject disclosure intends to ensure almost equal number of subbands per PUSCH, and the following three parameters calculated as follows are involved:

$$x = \mathrm{mod}(M, N),$$
$$y_1 = \left\lceil \frac{M}{N} \right\rceil,$$
$$y_2 = \left\lfloor \frac{M}{N} \right\rfloor.$$

Each of the first x PUSCHs of the N scheduled PUSCHs occupies $y_1$ subbands; and each of the remaining N-x PUSCHs occupies $y_2$ subbands. The first PUSCH occupies the first to the $y_1{}^{th}$ subbands, the second PUSCH occupies the $(y_1+1)^{th}$ to the $(2 \times y_1)^{th}$ subbands, . . . the $x^{th}$ PUSCH occupies the $((x-1) \times y_1+1)^{th}$ to the $(x \times y_1)^{th}$ subbands, the $(x+1)^{th}$ PUSCH occupies the $(x \times y_1+1)^{th}$ to the $(x \times y_1+y_2)^{th}$ subbands, . . . and the last PUSCH occupies the last $y_2$ subbands.

For example, in FIG. 3(b), the number of subbands M=4, and the number of PUSCH N=3, then x=1, $y_1$=2, $y_2$=1. Therefore, the first one PUSCH occupies two subbands, namely, the PUSCH 3000 occupies subbands 300-0 and 300-1, and the remaining two PUSCHs, PUSCH 3001 and PUSCH 3002, occupy subband 300-2 and subband 300-3 respectively. For another example, assuming M=8, N=3, then x=2, $y_1$=3, $y_2$=2. So each of the first two PUSCHs occupy three subbands, and the last PUSCH occupies the remaining two subbands. More specifically, the first PUSCH occupies the first three subbands, the second PUSCH occupies the next three subbands, and the last PUSCH occupies the last two subbands.

Figure 3C:
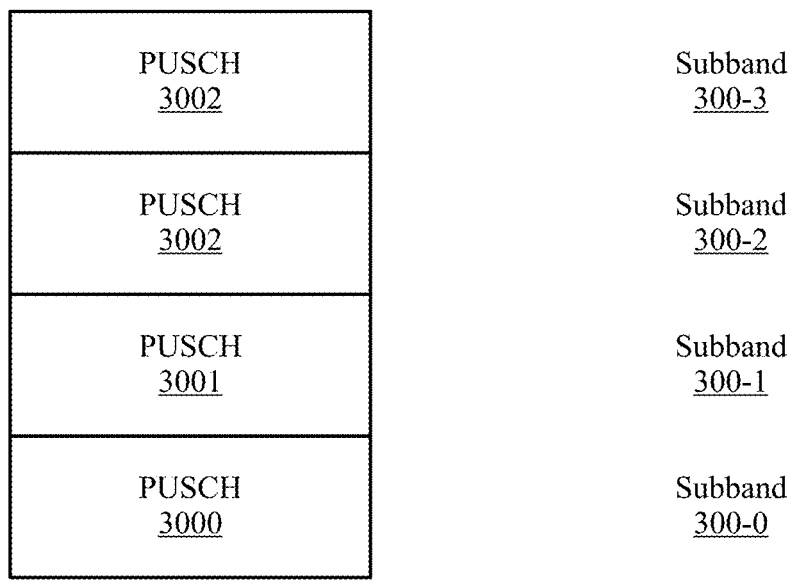
FIG. 3(c) illustrates yet another embodiment of a signal scheduling multiple PUSCHs/PDSCHs with one or more subbands or one or more carriers per PUSCH/PDSCH according to a preferred embodiment of the subject disclosure.

Alternatively, each of the last x PUSCHs of the N scheduled PUSCHs occupies $y_1$ subbands; and each of the first N-x PUSCHs occupies $y_2$ subbands. For example, in FIG. 3(c), the number of subbands M=4, and the number of PUSCH N=3, then x=1, $y_1$=2, $y_2$=1. Therefore, the last PUSCH occupies the last two subbands, namely, the PUSCH 3002 occupies subbands 300-2 and 300-3, and the first two PUSCHs, PUSCH 3000 and PUSCH 3001, occupy subband 300-0 and subband 300-1 respectively. For another example, assuming M=8, N=3, then x=2, $y_1$=3, $y_2$=2. So each of the last two PUSCHs occupy three subbands, and the remaining PUSCH occupies the remaining two subbands. More specifically, the last PUSCH occupies the last three subbands, the penultimate PUSCH occupies the next three subbands, and the first PUSCH occupies the first two subbands.

Rate matching is independently performed for each PUSCH in one or more associated subbands. LBT is performed independently in each of the assigned subbands. With the above method, almost equal number of subbands per PUSCH is ensured.

It should be noted that it is not reasonable that more than one PUSCHs in frequency domain are scheduled within one subband in the same slot. Therefore, in the subject disclosure, the number of subbands, M, is always greater than or equal to the number of PUSCHs, N, in short: M≥N.

In this subject disclosure, for resource mapping, frequency-first time-second manner is performed independently within each scheduled PUSCH on the assigned one or more subbands. The same time domain resource allocation indicated in the UL grant is adopted for each assigned subbands.

Regarding the Transport Block (TB) allocation on the PUSCHs, there are several approaches. In one embodiment, multiple TBs are allocated on multiple scheduled PUSCHs for control signaling overhead reduction, and one TB has an associated PUSCH. Therefore, each TB is carried by the associated PUSCH on the associated subband. New Data Indication (NDI) and Redundancy Version (RV) are present in the UL grant for each of scheduled PUSCHs. Hybrid Automatic Repeat reQuest (HARQ) process ID in the UL grant is applied to the first PUSCH, e.g., the PUSCH on the lowest subband index of the assigned subbands, then HARQ process ID for other scheduled PUSCH are incremented in order, if the index of the PUSCH is over 16, then a modulo 16 operation is performed to the index.

In another embodiment, only one TB is allocated on the multiple scheduled PUSCHs for reliability purpose. RRC signaling is introduced to configure UE the feature of one TB repetition in each assigned subband. When the feature is configured, the UE assumes that one dedicated bit is present in the UL grant or detects UL grant using the new RNTI. Therefore, the single TB has multiple transmission opportunities in frequency domain.

When there is only one of the assigned subbands passes the LBT procedure, the TB would be transmitted only in the subband.

When more than one subbands pass the LBT procedure, the TB might be transmitted with repetition in all the assigned subbands with successful LBT outcome. In other words, the same TB is repeated in the multiple subbands of one carrier so that the transmission reliability can be greatly improved. Alternatively, the TB might be transmitted only in one subband with successful LBT outcome, e.g., the subband may be the subband with the lowest or highest subband index of all the subbands with successful LBT outcome.

For the UL grant scheduling multiple PUSCHs on multiple subbands, the same payload size is maintained compared to the legacy UL grant scheduling single PUSCH on one or more subbands. There are some embodiments to differentiate the two UL grant formats:

The first method uses a new Radio Network Temporary Identity (RNTI), e.g., MultiPUSCH-on-multiSubbands-RNTI. The new RNTI is used to scramble the CRC of DCI scheduling multiple PUSCHs on multiple subbands.

The second embodiment is implemented with the UL grant indicating the number of actually scheduled PUSCHs. When the UL grant indicates that only one PUSCH is scheduled, it implies that the BS schedules one PUSCH on one or more subbands, which is similar to legacy UL grant; when the UL grant indicates that more than one PUSCH is scheduled, it implies that the BS schedules more than one PUSCH on multiple subbands, which is different to legacy UL grant.

The third approach is accomplished with one dedicated bit in DCI format, which indicates whether the scheduled TB is to be repeated on each of the assigned subbands or to be transmitted on the assigned subbands without repetition in frequency domain.

Figure 4:
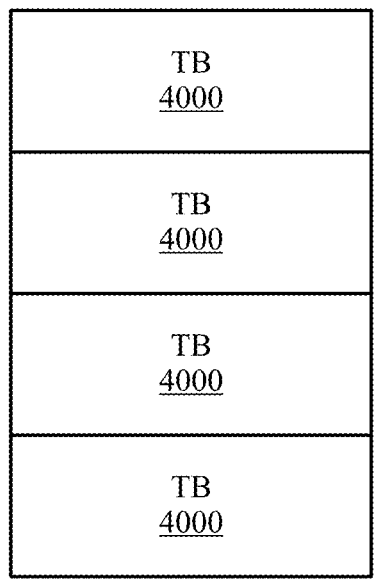
FIG. 4 illustrates an embodiment of a signal scheduling one PUSCH/PDSCH with TB repetition in each assigned subband according to a preferred embodiment of the subject disclosure.

Another preferred embodiment of the subject disclosure relates to a single DCI format scheduling a single PUSCH/PDSCH on multiple subbands or carriers of unlicensed spectrum. FIG. 4 illustrates an embodiment of one DCI format scheduling one PUSCH/PDSCH with TB repetition in each assigned subband or carrier according to a preferred embodiment of the subject disclosure. For simplicity, the following content uses PUSCH and subband as an example.

In FIG. 4, the one TB 4000 is dynamically scheduled by one UL grant on single PUSCH occupying more than one subbands: subband 400-0, 400-1, 400-2, and 400-3. The TB 4000 is repeated in each of the assigned subbands: subband 400-0, 400-1, 400-2, and 400-3. Each repetition of the TB is restricted within the region of the associated subband and not across subband boundary in frequency domain. Rate matching is adopted to align the TB resource mapping in each subband. LBT is performed independently in each of the assigned subbands. As long as one of the assigned subbands passes the LBT procedure, the TB would be transmitted in the subband.

When more than one subband passes the LBT procedure, the TB shall be transmitted with repetition in all the assigned subbands with successful LBT outcome. For example, in FIG. 4, the four subbands 400-0, 400-1, 400-2, and 400-3 have successful LBT outcome, and the TB 4000 is repeatedly transmitted on the four subbands. In this way, one TB has multiple transmission opportunities in multiple subbands of one carrier and can be repeated in the multiple subbands so that the transmission reliability can be greatly improved. Alternatively, the TB shall be transmitted only in one subband with successful LBT outcome, e.g., this subband can be the subband with the lowest or highest subband index of all the subbands with successful LBT outcome. For instance, in FIG. 4, the TB 4000 is transmitted only in subband 400-0.

For one UL grant scheduling single PUSCH carrying one TB repeated in multiple subbands, the same payload size is maintained compared to the legacy UL grant scheduling single PUSCH carrying one TB on one or more subbands. There are several embodiments to differentiate the two UL grant formats.

The first embodiment uses a new RNTI, e.g., TB-repetition-on-multi-subbands-RNTI. The new RNTI is used to scramble the CRC of DCI scheduling single PUSCH for TB repetition on multiple subbands.

The second method uses one dedicated bit in DCI format, which indicates whether the scheduled TB is to be repeated on each of the assigned subbands or to be transmitted on the assigned subbands without repetition in frequency domain.

RRC signaling is introduced to configure UE the feature of one TB repetition in each of assigned subbands. When the feature is configured, the UE assumes the aforementioned dedicated bit is present in the UL grant or detects UL grant using the new RNTI. If only one subband is assigned, then the TB is only transmitted on the assigned subband.

For resource mapping, frequency-first time-second manner is performed independently within each of the assigned subbands. In this way, as long as any one of the assigned subbands passes the LBT, there is 90% probability for the BS to successfully decode the TB. The UL grant indicates the same time domain resource allocation for each assigned subbands.

Still another preferred embodiment of the subject disclosure relates to multiple Configured Grant (CG)-PUSCHs/Semi-Persistent Scheduling (SPS)-PDSCHs on multi-LBT subbands or carriers over unlicensed spectrum, the CG-PUSCHs are configured by RRC signaling. The multiple CG-PUSCHs have the same time domain resource allocation, and the number of the CG-PUSCHs is configured by RRC signaling, which might be 1, 2, 4, 8, 12, 16, 32 etc.

In this embodiment, both the time domain resource and frequency domain resource are configured by RRC. The same time domain resource allocation is adopted for each assigned subbands.

Based on the above frequency domain resource allocation, the subject disclosure proposes a method to map the CG-PUSCHs to the assigned subbands. The principle is to ensure nearly equal number of subbands per CG-PUSCH, that is, any one CG-PUSCH occupies at most more than one subband compared to any other CG-PUSCH.

FIG. 3(a) also illustrates an embodiment of RRC signaling scheduling multiple CG-PUSCHs/SPS-PDSCHs with one subband or one carrier per CG-PUSCH/SPS-PDSCH according to a preferred embodiment of the subject disclosure. For simplicity, the following content only relates to CG-PUSCH occupying one subband, it should be noted that the embodiment could also apply to CG-PUSCH occupying one carrier, SPS-PDSCH occupying one subband and SPS-PDSCH occupying one carrier. In FIG. 3(a), there are four CG-PUSCHs, which are represented using the reference numerals 3000, 3001, 3002, and 3003; and there are four subbands, which are represented using the reference numerals 300-0, 300-1, 300-2, and 300-3. In this embodiment, the number of CG-PUSCH is always equal to the number of assigned subbands. Therefore, it is not necessary to indicate the number of configured CG-PUSCHs in the UL grant since the number of CG-PUSCHs is equal to the number of assigned subbands. Each CG-PUSCH is restricted within the region of the associated subband and not across the subband boundary in frequency domain. For example, CG-PUSCH 3000 is restricted within the region of subband 300-0. Rate matching is independently performed for each CG-PUSCH in the associated subband, and LBT is performed independently in each of the assigned subbands. For example, rate matching for CG-PUSCH 3000 is performed in subband 300-0, and LBT for subbands 300-0, 300-1, 300-2, and 300-3 are independently performed.

FIG. 3(b) also illustrates an embodiment of RRC signaling scheduling multiple CG-PUSCHs/SPS-PDSCHs with one or more subbands or one or more carriers per CG-PUSCH/SPS-PDSCH according to a preferred embodiment of the subject disclosure.

Suppose there are M subbands and N CG-PUSCHs, and M>N, then one or more CG-PUSCHs can occupy more than one subband in frequency domain. As explained above, in this subject disclosure, interlaced-based waveform is adopted, therefore, the term "occupy" means the CG-PUSCHs use the interlaces in the subband in frequency domain, not use all of the frequency resources in the subband in frequency domain.

As discussed above, the subject disclosure intends to ensure almost equal number of subbands per CG-PUSCH, and the following three parameters calculated as follows are involved:

$$x = \mathrm{mod}(M, N),$$
$$y_1 = \left\lceil \frac{M}{N} \right\rceil,$$
$$y_2 = \left\lfloor \frac{M}{N} \right\rfloor.$$

Each of the first x CG-PUSCHs of the N CG-PUSCHs occupies $y_1$ subbands; and each of the remaining N-x CG-PUSCHs occupies $y_2$ subbands. The first CG-PUSCH occupies the first to the $y_1^{th}$ subbands, the second CG-PUSCH occupies the $(y_1+1)^{th}$ to the $(2\times y_1)^{th}$ subbands, . . . the $x^{th}$ CG-PUSCH occupies the $((x-1)\times y_1+1)^{th}$ to the $(x\times y_1)^{th}$ subbands, the $(x+1)^{th}$ CG-PUSCH occupies the $(x\times y_1+1)^{th}$ to the $(x\times y_1+y_2)^{th}$ subbands, . . . and the last CG-PUSCH occupies the last $y_2$ subbands.

For example, in FIG. 3(b), the number of subbands M=4, and the number of CG-PUSCH N=3, then x=1, $y_1$=2, $y_2$=1. Therefore, the first one CG-PUSCH occupies two subbands, namely, the CG-PUSCH 3000 occupies subbands 300-0 and 300-1, and the remaining two CG-PUSCHs, CG-PUSCH 3001 and CG-PUSCH 3002, occupy subband 300-2 and subband 300-3 respectively. For another example, assuming M=8, N=3, then x=2, $y_1$=3, $y_2$=2. So each of the first two CG-PUSCHs occupy three subbands, and the last PUSCH occupies the remaining two subbands. More specifically, the first CG-PUSCH occupies the first three subbands, the second PUSCH occupies the next three subbands, and the last PUSCH occupies the last two subbands.

Alternatively, each of the last x CG-PUSCHs of the N CG-PUSCHs occupies $y_1$ subbands; and each of the first N-x CG-PUSCHs occupies $y_2$ subbands. For example, in FIG. 3(c), the number of subbands M=4, and the number of CG-PUSCH N=3, then x=1, $y_1$=2, $y_2$=1. Therefore, the last CG-PUSCH occupies two subbands, namely, the CG-PUSCH 3002 occupies subbands 300-2 and 300-3, and the first two CG-PUSCHs, CG-PUSCH 3000 and CG-PUSCH 3001, occupy subband 300-0 and subband 300-1 respectively. For another example, assuming M=8, N=3, then x=2, $y_1$=3, $y_2$=2. So each of the last two CG-PUSCHs occupy three subbands, and the first CG-PUSCH occupies the first two subbands.

Rate matching is independently performed for each CG-PUSCH in one or more associated subbands. LBT is performed independently in each of the assigned subbands. With the above method, almost equal number of subbands per CG-PUSCH is ensured.

It should be noted that it not reasonable that more than one CG-PUSCHs in frequency domain are configured within one subband in the same slot. Therefore, in the subject disclosure, the number of subbands, M, is always greater than or equal to the number of CG-PUSCHs, N, in short: M≥N.

In this subject disclosure, for resource mapping, frequency-first time-second manner is performed independently within each configured CG-PUSCH on the assigned one or more subbands. The same time domain resource allocation indicated in the UL grant is adopted for each assigned subbands.

Regarding the Transport Block (TB) allocation on the configured CG-PUSCHs, there are several approaches. In one embodiment, multiple TBs are allocated on multiple CG-PUSCHs for control signaling overhead reduction. Therefore, each TB is carried by the associated CG-PUSCH on the associated subband. HARQ process ID, New Data Indication (NDI) and Redundancy Version (RV) are present in the CG-UCI for each of configured CG-PUSCHs.

In another embodiment, only one TB is allocated on the multiple configured CG-PUSCHs for reliability purpose. RRC signaling is introduced to configure UE the feature of one TB repetition in each assigned subband. When the feature is configured, the UE assumes that one dedicated bit is present in the UL grant or detects UL grant using the new RNTI. Therefore, the single TB has multiple transmission opportunities in frequency domain.

When there is only one of the assigned subbands passes the LBT procedure, the TB would be transmitted only in the subband.

When more than one subbands pass the LBT procedure, the TB might be transmitted with repetition in all the assigned subbands with successful LBT outcome. In other words, the same TB is repeated in the multiple subbands of one carrier so that the transmission reliability can be greatly improved. Alternatively, the TB might be transmitted only in one subband with successful LBT outcome, e.g., the subband can be the subband with the lowest or highest subband index of all the subbands with successful LBT outcome.

Yet another preferred embodiment of the subject disclosure relates to a single CG-PUSCH/SPS-PDSCH on multi-LBT subbands over unlicensed spectrum, and the CG-PUSCH is configured by RRC signaling.

In FIG. 4, one CG-PUSCH is configured on more than one subbands: subbands 400-0, 400-1, 400-2, and 400-3, and one TB 4000 is repeated in each of the assigned subbands: subband 400-0, 400-1, 400-2, and 400-3. Each repetition of the TB is restricted within the region of the associated subband and not across subband boundary in frequency domain. Rate matching is adopted to align the TB resource mapping in each subband. LBT is performed independently in each of the assigned subbands. As long as one of the assigned subbands passes the LBT procedure, the TB would be transmitted in the subband.

When more than one subband passes the LBT procedure, the TB shall be transmitted with repetition in all the assigned subbands with successful LBT outcome. For example, in FIG. 4, the four subbands 400-0, 400-1, 400-2, and 400-3 have successful LBT outcome, and the TB 4000 is repeatedly transmitted on the four subbands. In this way, one TB has multiple transmission opportunities in multiple subbands of one carrier and can be repeated in the multiple subbands so that the transmission reliability can be greatly improved. Alternatively, the TB shall be transmitted only in one subband with successful LBT outcome, e.g., this subband can be the subband with the lowest or highest subband index of all the subbands with successful LBT outcome. For instance, in FIG. 4, the TB 4000 is transmitted only in subband 400-0.

For resource mapping, frequency-first time-second manner is performed independently within each of the assigned subbands. In this way, as long as any one of the assigned subbands passes the LBT, there is 90% probability for the BS to successfully decode the TB. The UL grant indicates the same time domain resource allocation for each assigned subbands.

Figure 5:
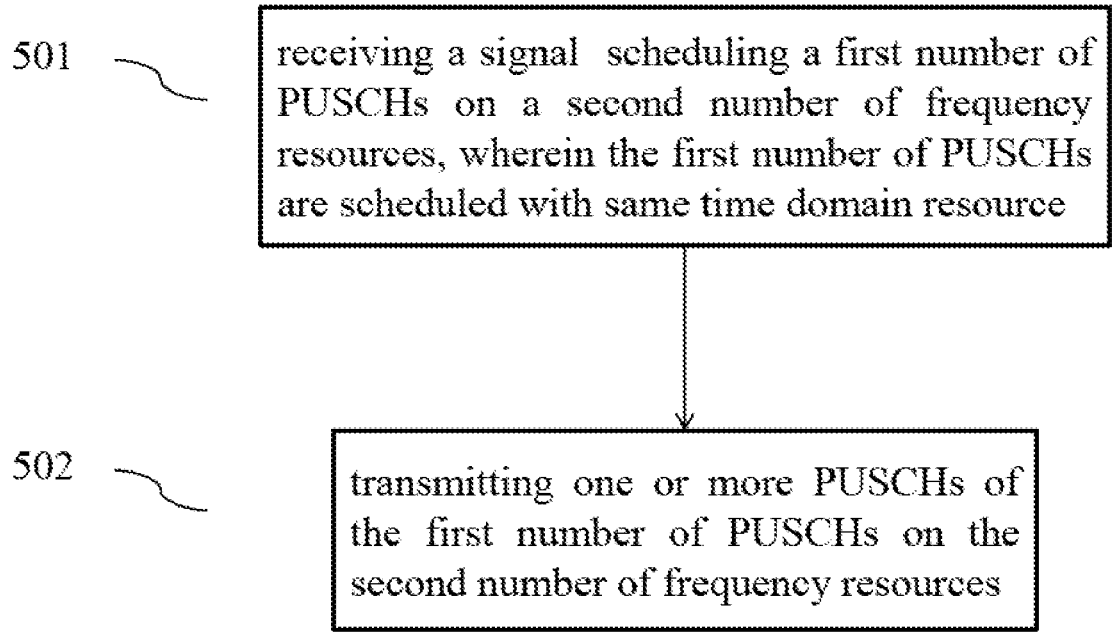
FIG. 5 illustrates a method performed by a UE for wireless communication according to a preferred embodiment of the subject disclosure.

FIG. 5 illustrates a method performed by a UE for wireless communication according to a preferred embodiment of the subject disclosure. In step 501, the UE receives a signal scheduling a first number of PUSCHs on a second number of frequency resources, wherein the first number of PUSCHs are scheduled with the same time domain resource. For example, in FIG. 3(*a*), the UE receives Downlink Control Information (DCI), i.e., UL grants, which schedules three PUSCHs on four subbands on one carrier or four carriers. For another example, the UE may receive RRC signaling, which configures the maximum number of the PUSCHs or configures the number of CG-PUSCHs. In step 502, the UE transmits one or more PUSCHs of the first number of PUSCHs on the second number of frequency resources. For example, in FIG. 3(*a*), the UE transmits three PUSCHs on four subbands or four carriers. The UE may transmits less than three PUSCHs on the four subbands or four carriers.

In one embodiment, the DCI includes an indicator indicating a value of the first number. The maximum number of schedulable PUSCHs by the DCI is configured by RRC signaling. In other words, the number of actually scheduled PUSCHs is indicated in the UL grant, which requires $\lceil \log_2 N_{max} \rceil$ bits, wherein $N_{max}$ is the RRC configured maximum number of schedulable PUSCHs by the single UL grant.

In this disclosure, the number of the PUSCHs is not larger than the number of the subbands on one carrier or the number of the carriers. Therefore, one or more scheduled PUSCHs may occupy more than one subband in frequency domain. In order to ensure nearly equal number of subbands or carriers per PUSCH, one mapping rule between the subbands or carriers and the PUSCHs is as follows:

Assuming there are M subbands or carriers and N PUSCHs, then each of a first x PUSCHs of the N PUSCHs is transmitted on $y_1$ subbands or carriers of the M subbands or carriers, and each of the remaining PUSCHs of the N PUSCHs is transmitted on $y_2$ subbands or carriers of the M subbands or carriers, wherein x is equal to a remainder of M divided by N, $y_1$ is determined by rounding up a quotient of M divided by N, and $y_2$ is determined by rounding down the quotient. For example, in FIG. 3(*b*), the number of subbands M=4, and the number of CG-PUSCH N=3, then x=1, $y_1$=2, $y_2$=1. Therefore, the first one CG-PUSCH occupies two subbands, namely, the CG-PUSCH 3000 occupies subbands 300-0 and 300-1, and the remaining two CG-PUSCHs, CG-PUSCH 3001 and CG-PUSCH 3002, occupy subband 300-2 and subband 300-3 respectively.

Another mapping rule between the subbands or carriers and the PUSCHs is as follows: each of a last x PUSCHs of the N PUSCHs is transmitted on $y_1$ subbands or carriers of the M subbands or carriers, and each of the first N-x PUSCHs of the N PUSCHs is transmitted on $y_2$ subbands or carriers of the M subbands or carriers, wherein x is equal to a remainder of M divided by N, $y_1$ is determined by rounding up a quotient of M divided by N, and $y_2$ is determined by rounding down the quotient. For example, in FIG. 3(*c*), the number of subbands M=4, and the number of CG-PUSCH N=3, then x=1, $y_1$=2, $y_2$=1. Therefore, the last CG-PUSCH occupies two subbands, namely, the CG-PUSCH 3002 occupies subbands 300-2 and 300-3, and the remaining CG-PUSCHs, CG-PUSCH 3000 and CG-PUSCH 3001, occupy subband 300-0 and subband 300-1 respectively.

In another embodiment, the number of the PUSCHs is equal to the number of the subbands on one carrier or the number of the carriers. Each PUSCH is transmitted on the associated subband or carrier.

As to the TB allocation on the scheduled PUSCHs, each of the first number of PUSCHs may carry a corresponding TB, or the same TB.

In one embodiment, the CRC of the DCI is scrambled by a new RNTI, e.g., MultiPUSCH-on-multiSubbands-RNTI, the new RNTI is configured by RRC signaling.

In another embodiment, the signal includes a dedicated bit, which indicates whether a TB is to be repeated on each of the assigned subbands with a successful LBT outcome or transmitted on the assigned subbands without repetition in frequency domain with a successful LBT outcome. For example, in FIG. 4, the TB 4000 is repeatedly transmitted on subband 400-0, 400-1, 400-2, and 4003.

In yet another embodiment, the signal schedules one PUSCH on the subbands with one TB repeatedly transmitted on each subband of the subbands.

Figure 6:
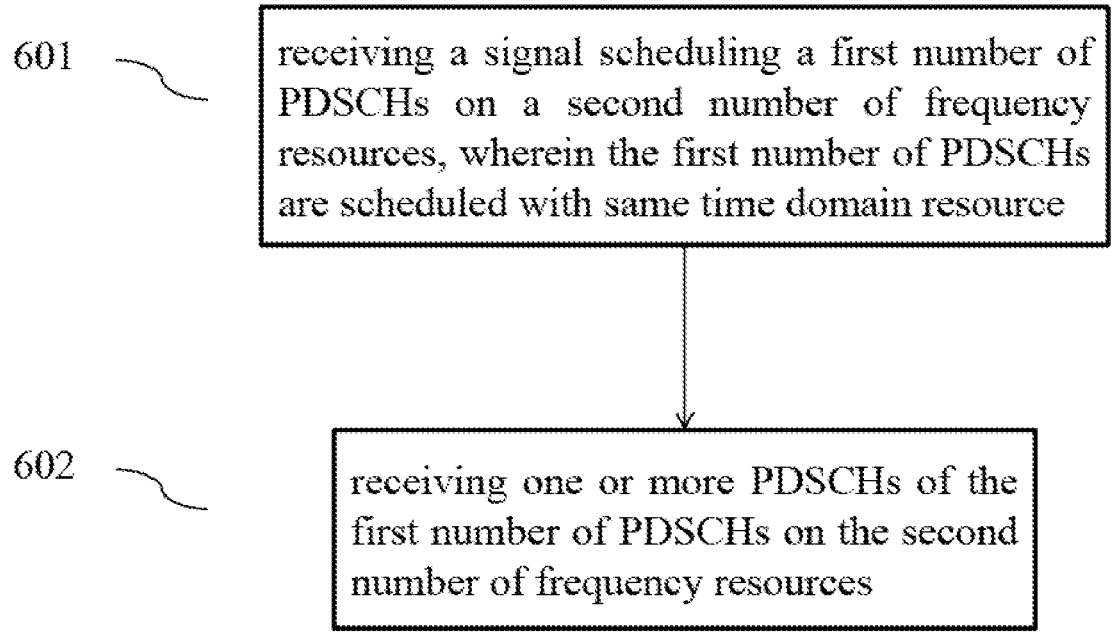
FIG. 6 illustrates another method performed by a UE for wireless communication according to a preferred embodiment of the subject disclosure.

FIG. 6 illustrates another method performed by a UE for wireless communication according to a preferred embodiment of the subject disclosure.

In step 601, the UE receives a signal scheduling a first number of PDSCHs on a second number of frequency resources, wherein the first number of PDSCHs are scheduled with same time domain resource. For example, in FIG. 3(a), the UE receives Downlink Control Information (DCI), i.e., DL grants, which schedules three PDSCHs on four subbands on one carrier or four carriers. For another example, the UE may receive RRC signaling, which configures the maximum number of the schedulable PDSCHs by single DL grant or configures the number of SPS-PDSCHs. In step 502, the UE receives one or more PDSCHs of the first number of PDSCHs on the second number of frequency resources. For example, in FIG. 3(a), the UE receives three PDSCHs on four subbands or four carriers. The UE may receive less than three PDSCHs on the four subbands or four carriers.

In one embodiment, the DCI includes an indicator indicating a value of the first number. The maximum number of schedulable PDSCHs by the DCI is configured by RRC signaling. In other words, the number of actually scheduled PDSCHs is indicated in the DL grant, which requires $\lceil \log_2 N_{max} \rceil$ bits, wherein $N_{max}$ is the RRC configured maximum number of schedulable PDSCHs by the single DL grant.

In this disclosure, the number of the PDSCHs is not larger than the number of the subbands on one carrier or the number of the carriers. Therefore, one or more scheduled PDSCHs may occupy more than one subband in frequency domain. In order to ensure nearly equal number of subbands or carriers per PDSCH, one mapping rule between the subbands or carriers and the PDSCHs is as follows:

Assuming there are M subbands or carriers and N PDSCHs, then each of a first x PDSCHs of the N PDSCHs is transmitted on $y_1$ subbands or carriers of the M subbands or carriers, and each of the remaining PDSCHs of the N PDSCHs is transmitted on $y_2$ subbands or carriers of the M subbands or carriers, wherein x is equal to a remainder of M divided by N, $y_1$ is determined by rounding up a quotient of M divided by N, and $y_2$ is determined by rounding down the quotient. For example, in FIG. 3(b), the number of subbands M=4, and the number of PDSCH N=3, then x=1, $y_1$=2, $y_2$=1. Therefore, the first one PDSCH occupies two subbands, namely, the PDSCH 3000 occupies subbands 300-0 and 300-1, and the remaining two PDSCHs, PDSCH 3001 and PDSCH 3002, occupy subband 300-2 and subband 300-3 respectively.

Another mapping rule between the subbands or carriers and the PDSCHs is as follows: each of a last x PDSCHs of the N PDSCHs is transmitted on $y_1$ subbands or carriers of the M subbands or carriers, and each of the remaining PDSCHs of the N PDSCHs is transmitted on $y_2$ subbands or carriers of the M subbands or carriers, wherein x is equal to a remainder of M divided by N, $y_1$ is determined by rounding up a quotient of M divided by N, and $y_2$ is determined by rounding down the quotient. For example, in FIG. 3(c), the number of subbands M=4, and the number of PDSCH N=3, then x=1, $y_1$=2, $y_2$=1. Therefore, the last PDSCH occupies two subbands, namely, the PDSCH 3002 occupies subbands 300-2 and 300-3, and the remaining PDSCHs, PDSCH 3000 and PDSCH 3001, occupy subband 300-0 and subband 300-1 respectively.

In another embodiment, the number of the PDSCHs is equal to the number of the subbands on one carrier or the number of the carriers. Each PDSCH is transmitted on the associated subband or carrier.

As to the TB allocation on the scheduled PDSCHs, each of the first number of PDSCHs may carry a corresponding TB, or the same TB.

In one embodiment, the CRC of the DCI is scrambled by a new RNTI, e.g., MultiPDSCH-on-multiSubbands-RNTI, and the new RNTI is configured by RRC signaling.

In another embodiment, the signal includes a dedicated bit, which indicates whether a TB is to be repeated on each of the assigned subbands with a successful LBT outcome or transmitted on the assigned subbands without repetition in frequency domain with a successful LBT outcome. For example, in FIG. 4, the TB 4000 is repeatedly transmitted on subband 400-0, 400-1, 400-2, and 4003.

In yet another embodiment, the signal schedules one PDSCH on the subbands with one TB repeatedly transmitted on each subband of the subbands.

Figure 7:
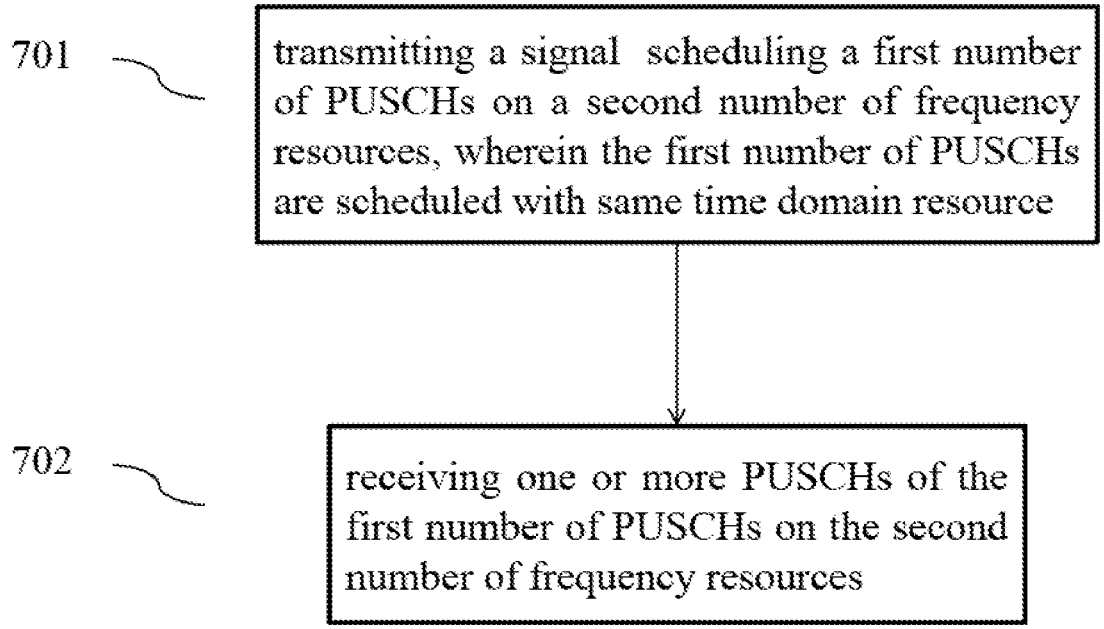
FIG. 7 illustrates a method performed by a BS for wireless communication according to a preferred embodiment of the subject disclosure.

FIG. 7 illustrates a method performed by a BS for wireless communication according to a preferred embodiment of the subject disclosure.

In step 701, the BS transmits a signal scheduling a first number of PUSCHs on a second number of frequency resources, wherein the first number of PUSCHs are scheduled with same time domain resource. For example, in FIG. 3(a), the BS transmits Downlink Control Information (DCI), i.e., UL grants, which schedules three PUSCHs on four subbands on one carrier or four carriers. For another example, the BS may transmit RRC signaling, which configures the maximum number of the PUSCHs or configures the number of CG-PUSCHs. In step 702, the BS receives one or more PUSCHs of the first number of PUSCHs on the second number of frequency resources. For example, in FIG. 3(a), the BS receives three PUSCHs on four subbands or four carriers. The BS may receive less than three PUSCHs on the four subbands or four carriers.

Figure 8:
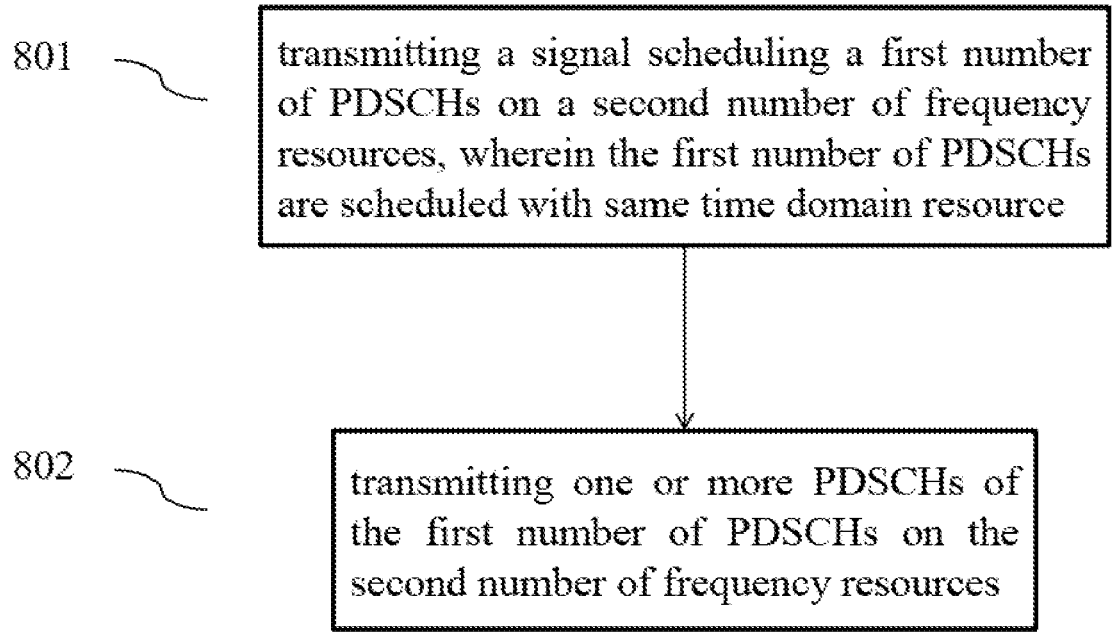
FIG. 8 illustrates another method performed by a BS for wireless communication according to a preferred embodiment of the subject disclosure.

FIG. 8 illustrates another method performed by a BS for wireless communication according to a preferred embodiment of the subject disclosure.

In step 801, the BS transmits a signal scheduling a first number of PDSCHs on a second number of frequency resources, wherein the first number of PDSCHs are scheduled with same time domain resource. For example, in FIG. 3(a), the BS transmits Downlink Control Information (DCI), i.e., DL grants, which schedules three PDSCHs on four subbands on one carrier or four carriers. For another example, the BS may transmit RRC signaling, which configures the maximum number of the PDSCHs or configures the number of SPS-PDSCHs. In step 802, the BS transmits one or more PDSCHs of the first number of PDSCHs on the second number of frequency resources. For example, in FIG. 3(a), the BS transmits three PDSCHs on four subbands or four carriers. The BS may transmits less than three PDSCHs on the four subbands or four carriers.

Figure 9:
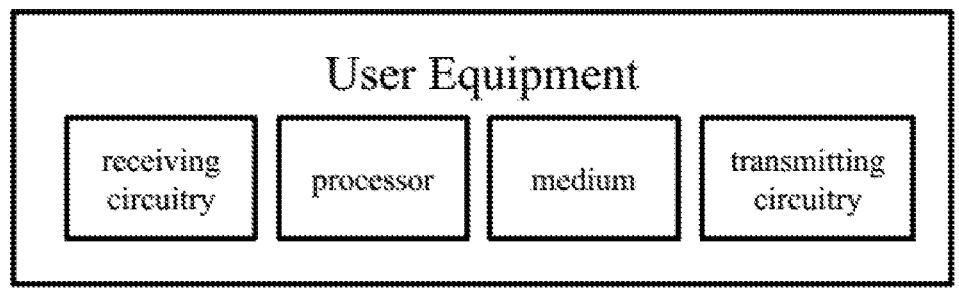
FIG. 9 illustrates a block diagram of a UE according to the embodiments of the subject disclosure.

FIG. 9 illustrates a block diagram of a UE according to the embodiments of the subject disclosure. The UE 101 may include a receiving circuitry, a processor, and a transmitting circuitry. In one embodiment, the UE 101 may include a non-transitory computer-readable medium having stored thereon computer-executable instructions; a receiving circuitry; a transmitting circuitry; and a processor coupled to the non-transitory computer-readable medium, the receiving circuitry and the transmitting circuitry.

The computer executable instructions can be programmed to implement a method (e.g. the method in FIG. 5) with the receiving circuitry, the transmitting circuitry and the processor. That is, upon performing the computer executable instructions, the receiving circuitry may receive, a signal scheduling a first number of PUSCHs on a second number of frequency resources, wherein the first number of PUSCHs are scheduled with same time domain resource; and the transmitting circuitry transmits one or more PUSCHs of the first number of PUSCHs on the second number of frequency resources.

The computer executable instructions can be programmed to implement another method (e.g. the method in FIG. 6) with the receiving circuitry, the transmitting circuitry and the processor. That is, upon performing the computer executable instructions, the receiving circuitry may receive, a signal scheduling a first number of PDSCHs on a second number of frequency resources, wherein the first number of PDSCHs are scheduled with same time domain resource; and the receiving circuitry receives one or more PDSCHs of the first number of PDSCHs on the second number of frequency resources.

Figure 10:
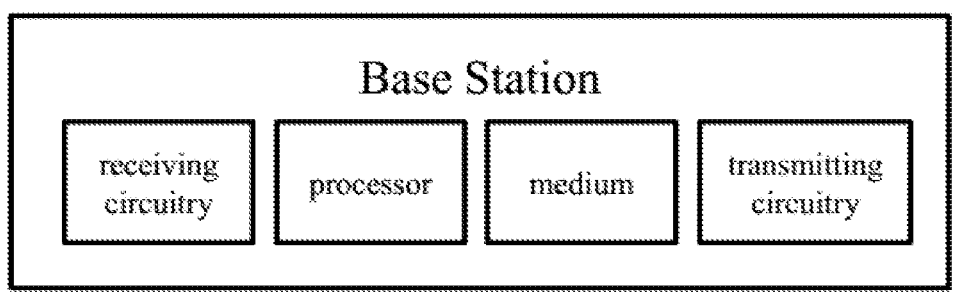
FIG. 10 illustrates a block diagram of a BS according to the embodiments of the subject disclosure.

FIG. 10 illustrates a block diagram of a BS according to the embodiments of the subject disclosure. The BS 102 may include a receiving circuitry, a processor, and a transmitting circuitry. In one embodiment, the BS may include a non-transitory computer-readable medium having stored thereon computer-executable instructions; a receiving circuitry; a transmitting circuitry; and a processor coupled to the non-transitory computer-readable medium, the receiving circuitry and the transmitting circuitry.

The computer executable instructions can be programmed to implement a method (e.g. the method in FIG. 7) with the receiving circuitry, the transmitting circuitry and the processor. That is, upon performing the computer executable instructions, the transmitting circuitry may transmit, a signal scheduling a first number of PUSCHs on a second number of frequency resources, wherein the first number of PUSCHs are scheduled with same time domain resource, and the receiving circuitry may receive one or more PUSCHs of the first number of PUSCHs on the second number of frequency resources.

The computer executable instructions can be programmed to implement a method (e.g. the method in FIG. 8) with the receiving circuitry, the transmitting circuitry and the processor. That is, upon performing the computer executable instructions, the transmitting circuitry may transmit, a signal scheduling a first number of PDSCHs on a second number of frequency resources, wherein the first number of PDSCHs are scheduled with same time domain resource, and the transmitting circuitry may transmit one or more PDSCHs of the first number of PDSCHs on the second number of frequency resources.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A user equipment (UE) for wireless communication, comprising:
   at least one memory; and
   at least one processor coupled with the at least one memory and configured to cause the UE to:
      receive radio resource control (RRC) signaling that configures a maximum quantity of physical uplink shared channel (PUSCHs) schedulable by a downlink control information (DCI) format;
      receive a DCI having the DCI format configured by the RRC signaling, the DCI scheduling a first quantity of PUSCHs on a second quantity of frequency resources, wherein:
         the first quantity is greater than or equal to two,
         the second quantity is greater than or equal to the first quantity, and
         the first quantity of PUSCHs are scheduled with a same time domain resource; and transmit one or more PUSCHs of the first quantity of PUSCHs on the second quantity of frequency resources.

2. The UE of claim 1, wherein the DCI comprises an indicator indicating a value of the first quantity.

3. The UE of claim 1, wherein the second quantity of frequency resources comprises a quantity of subbands corresponding to the second quantity on one carrier.

4. The UE of claim 3, wherein the quantity of subbands are contiguous in a frequency domain.

5. The UE of claim 3, wherein each PUSCH of the first quantity of PUSCHs is scheduled on a respective subband of the quantity of subbands.

6. The UE of claim 3, wherein the at least one processor is further configured to cause the UE to perform a respective listen-before-talk (LBT) procedure on each subband of the quantity of subbands.

7. The UE of claim 1, wherein the second quantity of frequency resources comprises a quantity of carriers corresponding to the second quantity.

8. The UE of claim 7, wherein the DCI includes a resource indication value (RIV) indicating the carriers of the quantity of carriers.

9. The UE of claim 7, wherein each PUSCH of the first quantity of PUSCHs is scheduled on a respective carrier of the quantity of carriers.

10. The UE of claim 1, wherein the first quantity is not larger than the second quantity.

11. The UE of claim 1, wherein each PUSCH of the first quantity of PUSCHs carries a respective transport block.

12. The UE of claim 1, wherein each PUSCH of the first quantity of PUSCHs carries a respective repetition of a same transport block.

13. The UE of claim 1, wherein a dedicated bit in the DCI format indicates whether a transport block carried by one or more of the first quantity of PUSCHs is to be repeated on each frequency resource of the second quantity of resources or is to be transmitted on the second quantity of resources without repetition in a frequency domain.

14. A base station for wireless communication, comprising:
at least one memory; and
at least one processor coupled with the at least one memory and configured to cause the base station to:
transmit radio resource control (RRC) signaling that configures a maximum quantity of physical uplink shared channel (PUSCHs schedulable by a downlink control information (DCI) format;
transmit a DCI having the DCI format configured by the RRC signaling, the DCI scheduling a first quantity of PUSCHs on a second quantity of frequency resources, wherein:
the first quantity is greater than or equal to two,
the second quantity is greater than or equal to the first quantity, and
the first quantity of PUSCHs are scheduled with a same time domain resource; and
receive one or more PUSCHs of the first quantity of PUSCHs on the second quantity of frequency resources.

15. The base station of claim 14, wherein the second quantity of frequency resources comprises a quantity of subbands corresponding to the second quantity on one carrier.

16. The base station of claim 14, wherein the second quantity of frequency resources comprises a quantity of carriers corresponding to the second quantity.

17. A processor for wireless communication, comprising:
at least one controller coupled with at least one memory and configured to cause the processor to:
receive radio resource control (RRC) signaling that configures a maximum quantity of physical uplink shared channel (PUSCHs) schedulable by a downlink control information (DCI) format;
receive a DCI having the DCI format configured by the RRC signaling, the DCI scheduling a first quantity of PUSCHs on a second quantity of frequency resources, wherein:
the first quantity is greater than or equal to two,
the second quantity is greater than or equal to the first quantity, and
the first quantity of PUSCHs are scheduled with a same time domain resource; and
transmit one or more PUSCHs of the first quantity of PUSCHs on the second quantity of frequency resources.

18. The processor of claim 17, wherein the DCI comprises an indicator indicating a value of the first quantity.

19. The processor of claim 17, wherein the second quantity of frequency resources comprises a quantity of subbands corresponding to the second quantity on one carrier.

20. A method performed by a user equipment (UE), the method comprising:
receiving radio resource control (RRC) signaling that configures a maximum quantity of physical uplink shared channel (PUSCHs) schedulable by a downlink control information (DCI) format;
receiving a DCI having the DCI format configured by the RRC signaling, the DCI scheduling a first quantity of PUSCHs on a second quantity of frequency resources, wherein:
the first quantity is greater than or equal to two,
the second quantity is greater than or equal to the first quantity, and
the first quantity of PUSCHs are scheduled with a same time domain resource; and
transmitting one or more PUSCHs of the first quantity of PUSCHs on the second quantity of frequency resources.

* * * * *